United States Patent
Avis

(10) Patent No.: US 7,866,412 B2
(45) Date of Patent: Jan. 11, 2011

(54) VIBRATION ATTENUATED POWER TOOL

(75) Inventor: Mark Avis, Manchester (GB)

(73) Assignee: Black & Decker Inc., Newark, DE (US)

( * ) Notice: Subject to any disclaimer, the term of this patent is extended or adjusted under 35 U.S.C. 154(b) by 275 days.

(21) Appl. No.: 10/597,376

(22) PCT Filed: Dec. 6, 2005

(86) PCT No.: PCT/EP2005/056538

§ 371 (c)(1),
(2), (4) Date: Jul. 14, 2008

(87) PCT Pub. No.: WO2006/061389

PCT Pub. Date: Jun. 15, 2006

(65) Prior Publication Data

US 2008/0257578 A1      Oct. 23, 2008

(30) Foreign Application Priority Data

Dec. 7, 2004   (GB) .................................. 0426719.1

(51) Int. Cl.
*B25D 17/10* (2006.01)
*B23Q 5/10* (2006.01)
(52) U.S. Cl. ................. 173/162.1; 173/162.2; 173/171; 173/217

(58) Field of Classification Search .............. 173/162.1, 173/162.2, 171
See application file for complete search history.

(56) References Cited

U.S. PATENT DOCUMENTS

| | | | | |
|---|---|---|---|---|
| 4,905,772 | A * | 3/1990 | Honsa et al. | 173/162.1 |
| 5,375,666 | A * | 12/1994 | Pettet et al. | 173/162.1 |
| 5,394,039 | A * | 2/1995 | Suchdev et al. | 310/51 |
| 5,692,574 | A * | 12/1997 | Terada | 173/162.2 |
| 5,738,177 | A * | 4/1998 | Schell et al. | 173/178 |
| 6,805,207 | B2 * | 10/2004 | Hagan et al. | 173/170 |
| 7,152,695 | B2 * | 12/2006 | Happ et al. | 173/217 |
| 2003/0048025 | A1 * | 3/2003 | Vaucher | 310/233 |
| 2004/0216907 | A1 * | 11/2004 | Happ et al. | 173/217 |
| 2007/0006393 | A1 * | 1/2007 | Ishida et al. | 8/147 |
| 2007/0247009 | A1 * | 10/2007 | Hoffman et al. | 310/51 |
| 2008/0297933 | A1 * | 12/2008 | Hsu et al. | 359/892 |

* cited by examiner

*Primary Examiner*—Brian D Nash
(74) *Attorney, Agent, or Firm*—Stephen R. Valancius

(57) ABSTRACT

A vibration attenuated power drill. The drill includes a housing incorporating a motor for driving an output shaft. A drill bit is driven by the output shaft by means of cooperating ratchet plates contained in a gearbox. The motor has a stator and a rotor, and is provided with leaf springs which attenuate vibrations transmitted from the motor to the housing along the axis of rotation of the rotor relative to the stator.

18 Claims, 4 Drawing Sheets

VIBRATION ATTENUATED POWER TOOL

FIELD OF THE INVENTION

The present invention relates to power tools and relates particularly, but not exclusively, to percussive power drills.

BACKGROUND OF THE INVENTION

Power drills for drilling masonry are known in which a percussive action is imparted to the drill bit by means of cooperating ratchet plates on a shaft supporting the drill bit and a body of the drill relative to which the shaft rotates. As the cooperating ratchet plates rotate relative to each other, the ratchet plate on the shaft supporting the drill bit is provided with an axial impulse, which is transmitted to the drill bit.

Percussive drills of this type suffer from the drawback that the interaction of a drill bit of such a drill with masonry being drilled generates significant vibrations, which can be detrimental to the health of users of the drill over prolonged periods of use. Such vibrations generally include a high frequency component caused by the vibration of the ratchet plates, typically in the region of 580 Hz, and a low frequency component caused by vibration of a drill bit of the drill in a hole being formed by the drill. Of particular concern are the low frequency components of vibration (typically 10-20 Hz), which are found to cause the most significant long-term health problems. As a result, standards relating to hand-arm vibration use weighting factors to describe the level of vibration likely to cause injury. In particular, a mathematical filter equation is used which emphasises frequencies closest to the 10-20 Hz band, but duration of exposure as well as instantaneous vibration level is taken into account.

It is known to attempt to reduce the vibrations transmitted to the hands of a user of a power tool by providing vibration damping material such as an elastomeric material around at least those parts of the tool housing which are held by the user. However, the stiffness of elastomeric materials is generally too high to significantly attenuate the low frequency component of the vibrations generated by operation of the tool, the low frequency component generally being the most damaging to health.

Preferred embodiments of the present invention seek to overcome the above disadvantages of the prior art.

BRIEF SUMMARY OF THE INVENTION

According to the present invention, there is provided a power tool comprising:—
a housing;
a motor within the housing for actuating a working member of the tool, the motor having a stator and a rotor adapted to rotate about a first axis relative to said stator; and
first vibration attenuating means for attenuating vibrations transmitted from said stator to said housing at least in a direction substantially parallel to said first axis.

By providing vibration attenuating means for attenuating vibrations transmitted from the stator to the housing, this provides the surprising advantage of much more effectively reducing the level of vibration transmitted to the hands of a user of the tool, and is especially effective in reducing transmission of the high frequency components typically caused by ratchet plates of a percussive power drill. The further advantage is provided that forces can be more effectively transmitted into a workpiece, with the effect that a power drill having ratchet plates to impart a hammer action to a drill bit operates more effectively for a given ratchet plate profile.

In a preferred embodiment, the stator is displaceable relative to said housing in a direction substantially parallel to said first axis, and the first vibration attenuating means comprises biasing means for resisting said displacement of said stator relative to the housing at least in a direction substantially parallel to said first axis.

Said biasing means may comprise at least one resilient member.

Said biasing means may comprise a plurality of first said resilient members circumferentially spaced around said first axis and a plurality of second said resilient members offset from said first resilient members in a direction parallel to said first axis.

By providing circumferentially spaced resilient members, this provides the advantage of allowing axial displacement of said stator relative to said housing while maintaining torsional rigidity of said motor.

Said first resilient members may be circumferentially offset relative to said second resilient members.

At least one said resilient member may comprise at least one respective leaf spring.

The resilience of at least one said resilient member may be adjustable.

This provides the advantage of enabling the frequency at which vibrations are most effectively attenuated to be adjusted, which in turn enables the resilience of the first vibration damping means to be tuned, for example, to the frequency of operation of ratchet plates of a percussive drill.

In a preferred embodiment, at least one said leaf spring comprises a plurality of removable spring members.

By providing a leaf spring comprising a plurality of removable members, for example in the form of a set of multiple laminations of spring plates, this provides the advantage of enabling the resilience of the first vibration attenuating means to be easily adjusted.

The first vibration attenuating means may comprise a plurality of interchangeable said resilient members having different residencies.

This enables the resilience of the first vibration attenuating means, and therefore the frequency at which vibrations are most effectively attenuated, to be adjusted by replacing a resilient member with a resilient member of different resilience.

In a preferred embodiment, a plurality of said resilient members are connected between said stator and at least one support.

The tool may further comprise resilient second vibration attenuating means for attenuating vibrations along three orthogonal axes transmitted from a working member of said tool to said housing.

This provides the advantage of enabling harmful low frequency vibration components to be effectively attenuated.

The second vibration attenuating means may act between at least one said support and said housing.

The tool may further comprise a gearbox connected to said motor, wherein said second vibration attenuating means acts between said gearbox and said housing.

Said second vibration attenuating means may comprise a plurality of further resilient members.

At least one first said further resilient member may be connected between a bearing of said rotor and said housing.

The tool may comprise a plurality of said first further resilient members and a plurality of said second further resilient members, wherein said first and second further resilient members are circumferentially spaced about said first axis, and said first further resilient members are circumferentially offset relative to said second further resilient members.

Said first and second further resilient members may be arranged substantially perpendicularly to said first axis.

The tool may further comprise at least one third further resilient member arranged substantially parallel to said first axis.

This provides the advantage of enabling the stiffness of the tool along the first axis to be increased to prevent the tool from becoming too compliant in an axial direction.

At least one said further resilient member may have adjustable resilience.

This provides the advantage of enabling further adjustment of the frequency at which vibrations are most effectively attenuated.

At least one said further resilient member may comprise a respective spring acting against a respective abutment having adjustable position.

BRIEF DESCRIPTION OF THE DRAWINGS

A preferred embodiment of the invention will now be described, by way of example only and not in any limitative sense, with reference to the accompanying drawings, in which.

DETAILED DESCRIPTION OF EXEMPLARY EMBODIMENTS OF THE INVENTION

Figure 1:
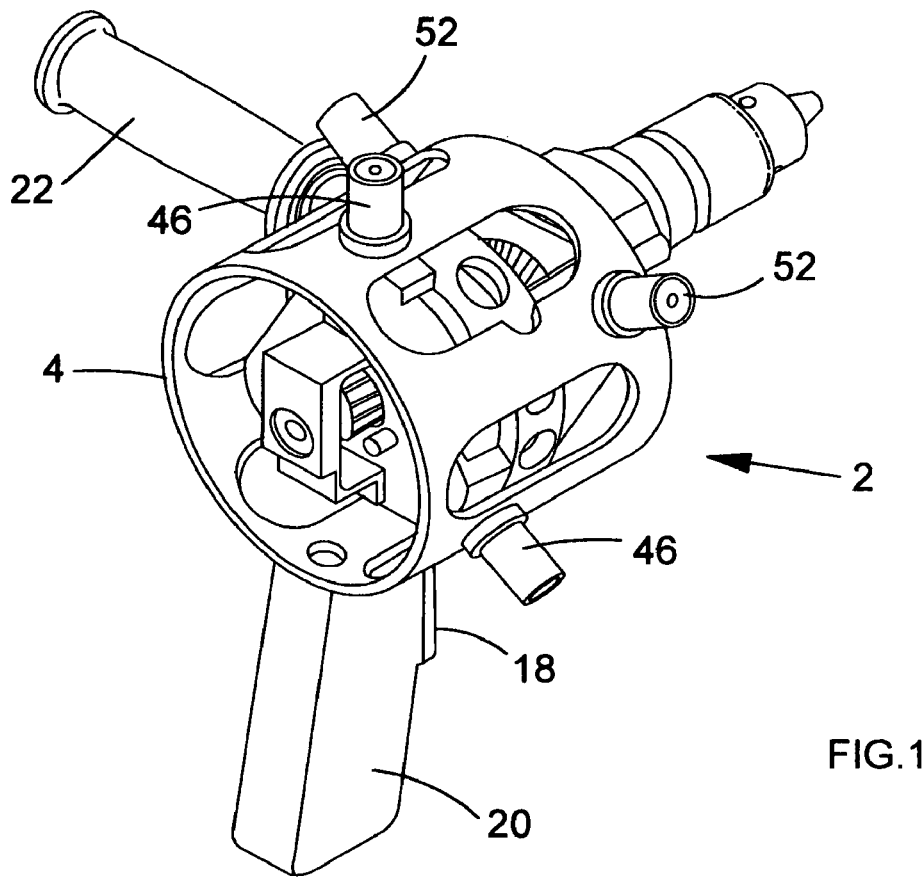
FIG. 1 is a perspective schematic view of a power drill embodying the present invention.
Figure 2:
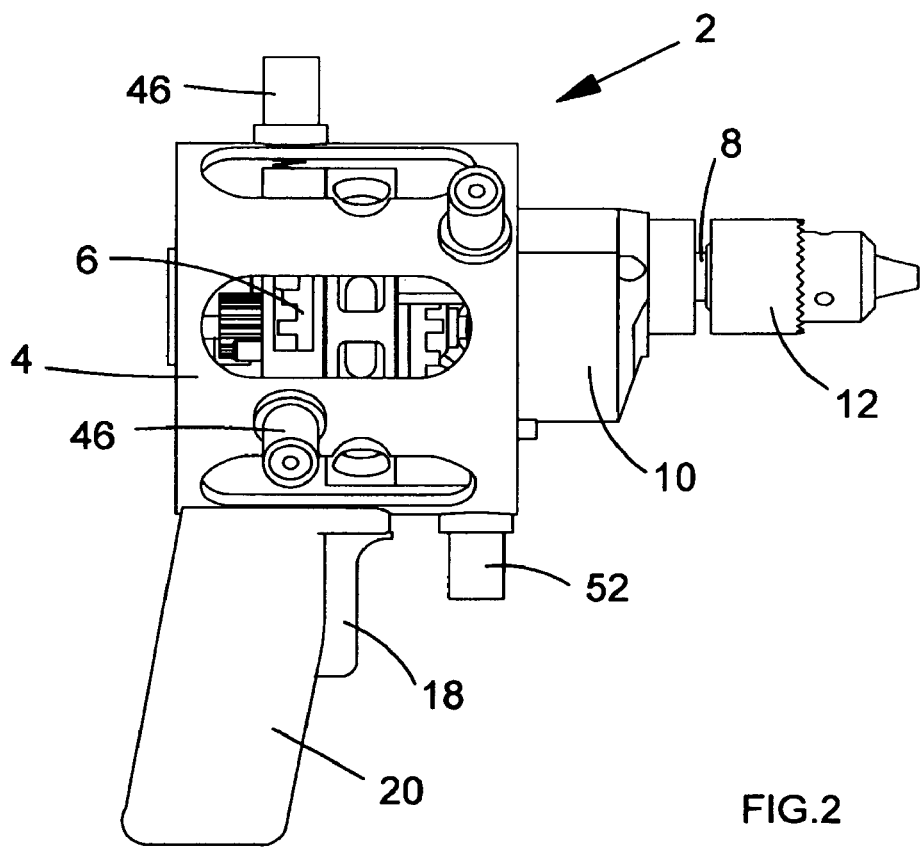
FIG. 2 is a side elevation view of the power drill of FIG. 1.
Figure 3:
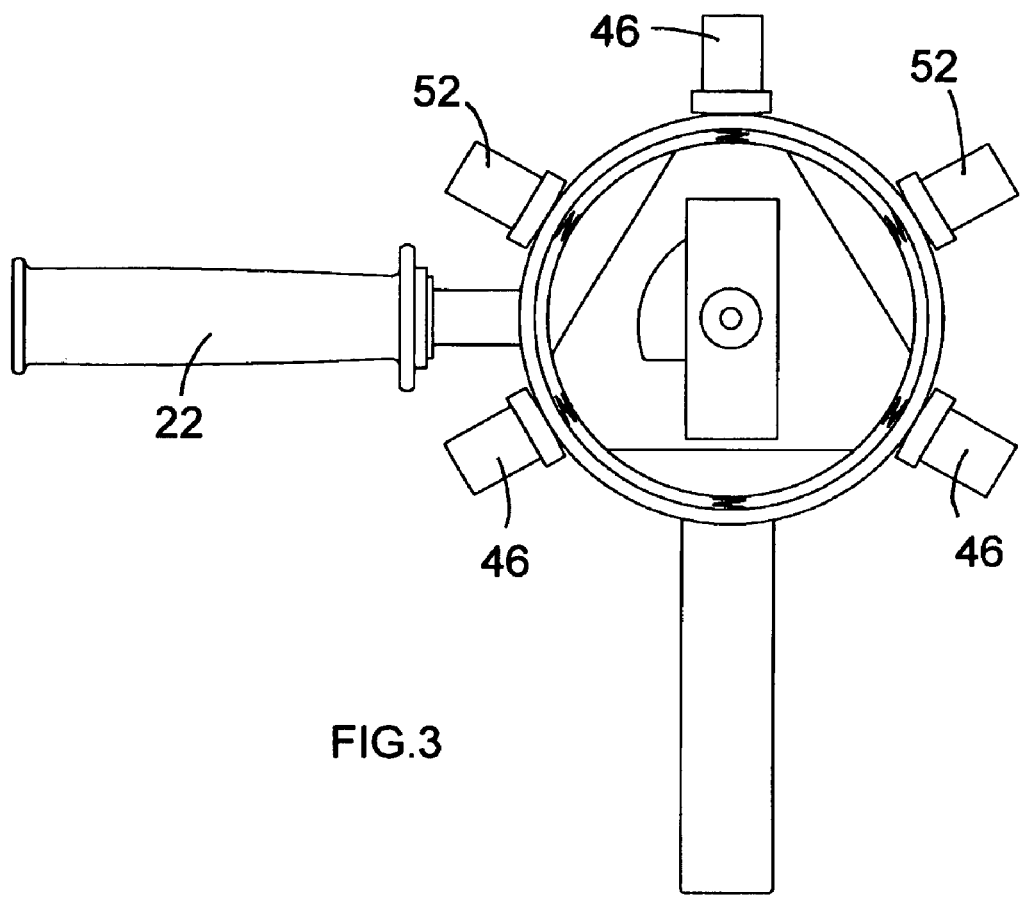
FIG. 3 is a rear view of the power drill of FIG. 1.

Referring to FIGS. 1 and 2, a power drill 2 has a housing 4 incorporating a motor 6 for driving an output shaft 8 via a gearbox 10, in a manner which will be familiar to persons skilled in the art. The output shaft 8 carries a chuck 12 to which a drill bit (not shown) is mounted, and cooperating ratchet plates (not shown) contained within the gearbox 10 are connected to an output gear of the gearbox 10 and to the output shaft 8 respectively, to impart a percussive action to the chuck 12 as they are rotated relative to each other as a result of rotation of the output shaft 8 relative to the housing 4. Rotation of the output shaft 8 is caused by actuation of the motor 6, which is powered by squeezing a trigger 18 provided on a handle 20. The drill 2 is also provided with a further handle 22.

Figure 4:
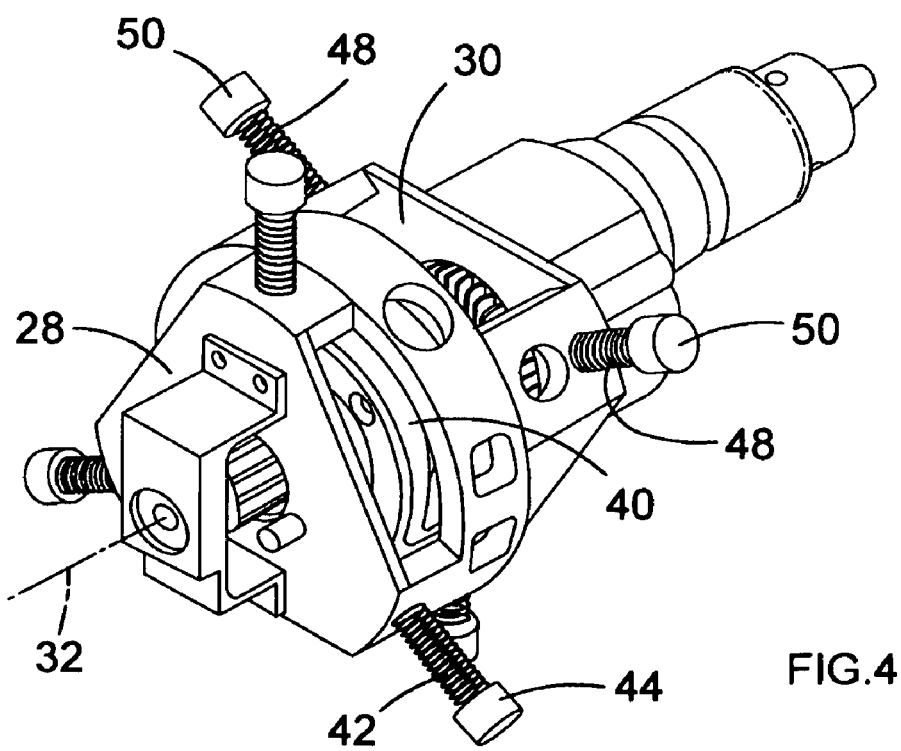
FIG. 4 is a perspective schematic view of a motor and gearbox assembly and second vibration damping means of the power drill of FIGS. 1 to 3.
Figure 5:
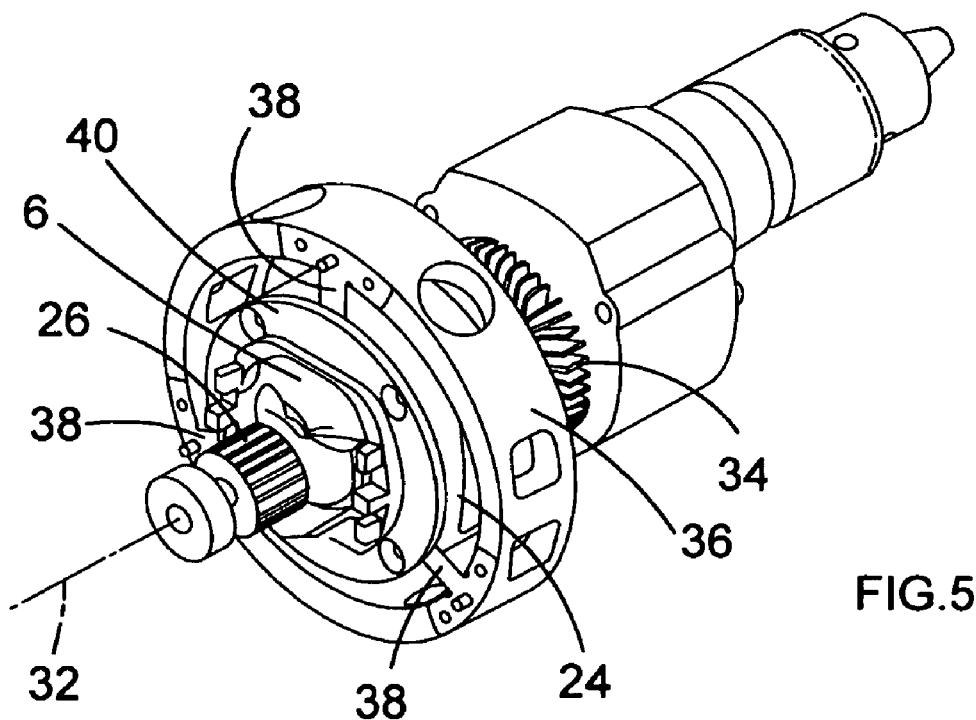
FIG. 5 is a schematic perspective view of the assembly of FIG. 4 with the rotor bearing supports and the second vibration attenuating means removed.

Referring now to FIGS. 4 and 5, the motor 6 comprises a stator 24 and a rotor 26, the rotor 26 being mounted to rear 28 and front 30 bearings so that the rotor 26 can rotate about axis 32 relative to stator 24. The rotor 26 also carries a fan 34 for generating air flow to cool the motor 6 in a manner which will be familiar to persons skilled in the art.

Figure 6:
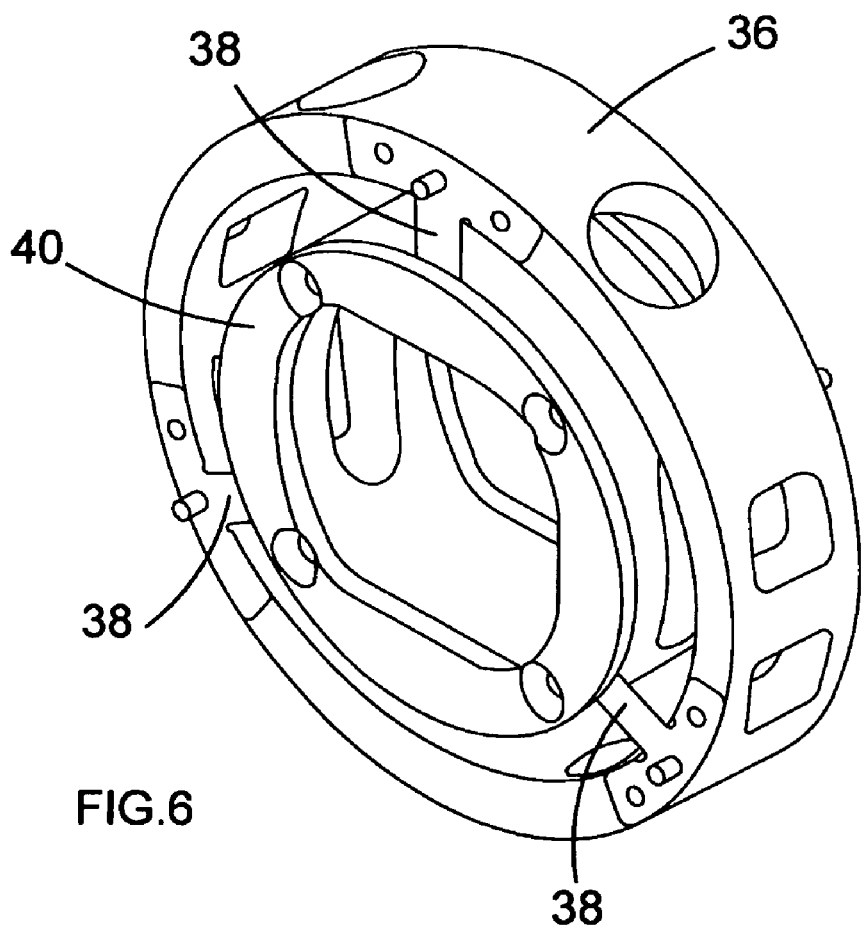
FIG. 6 is a schematic perspective view of a first vibration attenuating means of the assembly of FIGS. 4 and 5.

The stator 24 is mounted to a support 36 by means of a first vibration attenuating means in the form of two sets of three leaf springs 38 spaced equiangularly about the rotation axis 32 of rotor 26 and arranged at opposite axial ends of the stator 24 (only one set of leaf springs 38 being shown in FIGS. 5 and 6). Each set of leaf springs 38 is clamped to an end of the stator 24 by means of a respective end plate 40, and each leaf spring 38 is formed from multiple removable laminate sections, so that the spring force of each leaf spring 38 can be adjusted by adding or removing laminate sections. The leaf springs 38 at the opposite ends of the stator 24 are offset from each other by approximately 60 degrees. In this way, the stator 24 can move axially relative to support 36, but torsional movement of the stator 24 relative to the support 36 is minimised. In this way, the leaf springs 38 serve to absorb the high frequency component of vibrations, which is generally caused by vibration of the ratchet plates in gearbox 10, and is typically near to 580 Hz.

Referring now to FIG. 4, the support 36 is rigidly mounted to rear shaft bearing 28 and to forward shaft bearing 30 by means of screws (not shown). The rear bearing 28 is then mounted to the housing 4 by means of a set of three equiangularly spaced compression springs 42. Each of the springs 42 is located in a spring cup 44, and the spring cups 44 are threaded and located in respective sleeves 46 (FIGS. 1 and 2) in the housing 4 to allow adjustment of the pre-loading of springs 42, which in turn adjusts the resonant frequency of oscillation of the motor 6 relative to the housing 4.

Similarly, the forward bearing 30 is mounted to the housing 4 by means of three equiangularly arranged compression springs 48, which are offset at approximately 60 degrees relative to compression springs 42, and which in turn are located in respective spring cups 50 which are threaded and located in respective sleeves 52 in housing 4 to allow adjustment of the pre-loading of the springs 48. The springs 42, 48 form a second vibration attenuating means, for minimising the transmission of vibrations from the motor 6 to the housing 4 while avoiding making the drill bit (not shown) too compliant relative to the housing 4. It is found that the springs 42, 48 are particularly effective in attenuating both the low and high frequency components of vibration caused by vibration of the drill bit in a hole being drilled.

Furthermore, although not specifically shown in the embodiment described above, one or more compression springs can be arranged along axis 32 between the rear portion of the motor 6 and the housing 4. This avoids the drill bit becoming too compliant relative to the housing 4 in an axial direction, ensuring that the steady application of force by the user onto a masonry workpiece results in acceptable axial spring displacement.

The operation of the power drill 2 shown in FIGS. 1 to 6 will now be described with additional reference to FIGS. 7 and 8.

When the motor 6 is energised by squeezing trigger 18 on handle 20, the output shaft 8 rotates, which in turn rotates chuck 12 and drill bit (not shown) and the ratchet plates located in gearbox 10 impart a percussive action to the drill bit. Transmission to the housing 4 of high frequency vibrations generated as a result of relative rotation of the ratchet plates in gearbox 10 is minimised as a result of the axial movement of motor stator 24 relative to the housing support 30, and of movement of the support 30 relative to the housing 4 about axes generally perpendicular and parallel to the axis 32 of rotation of the motor rotor 26 relative to the stator 24. Also, movement of the support 30 relative to the housing 4 is effective in attenuating harmful low frequency vibrations caused by vibration of the drill bit in the hole being drilled.

Figure 7:
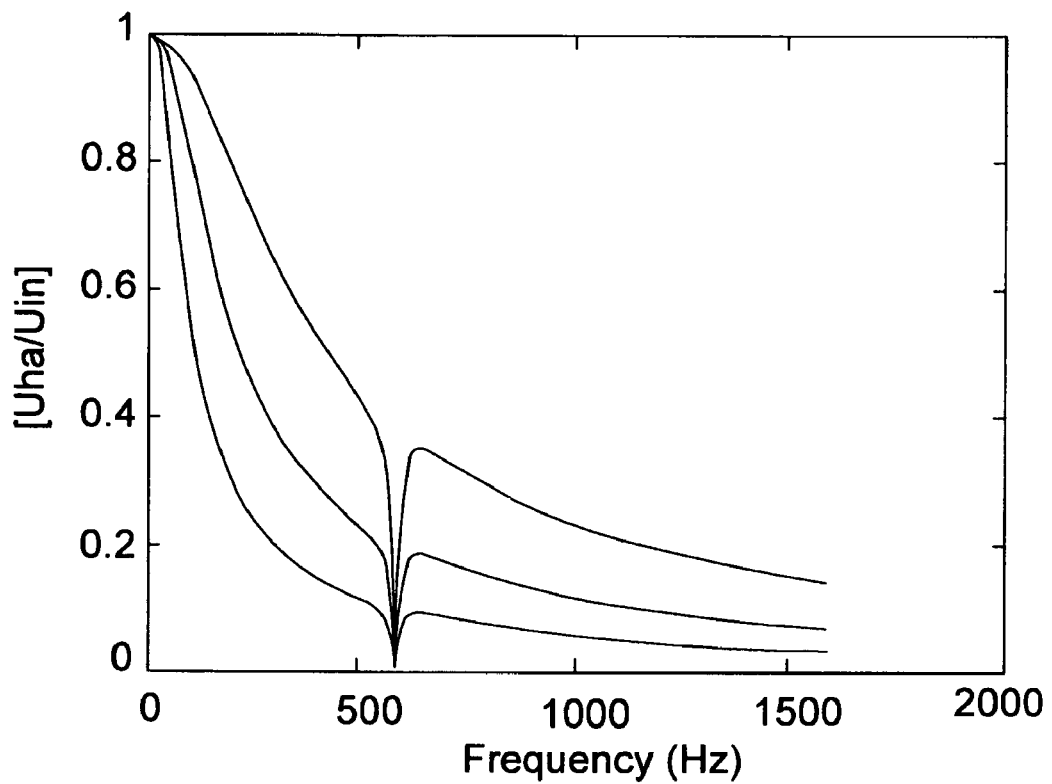
FIG. 7 is a graph showing the variation of amplitude of vibration transmitted to a hand of a user with frequency for the drill of FIGS. 1 to 6.
Figure 8:
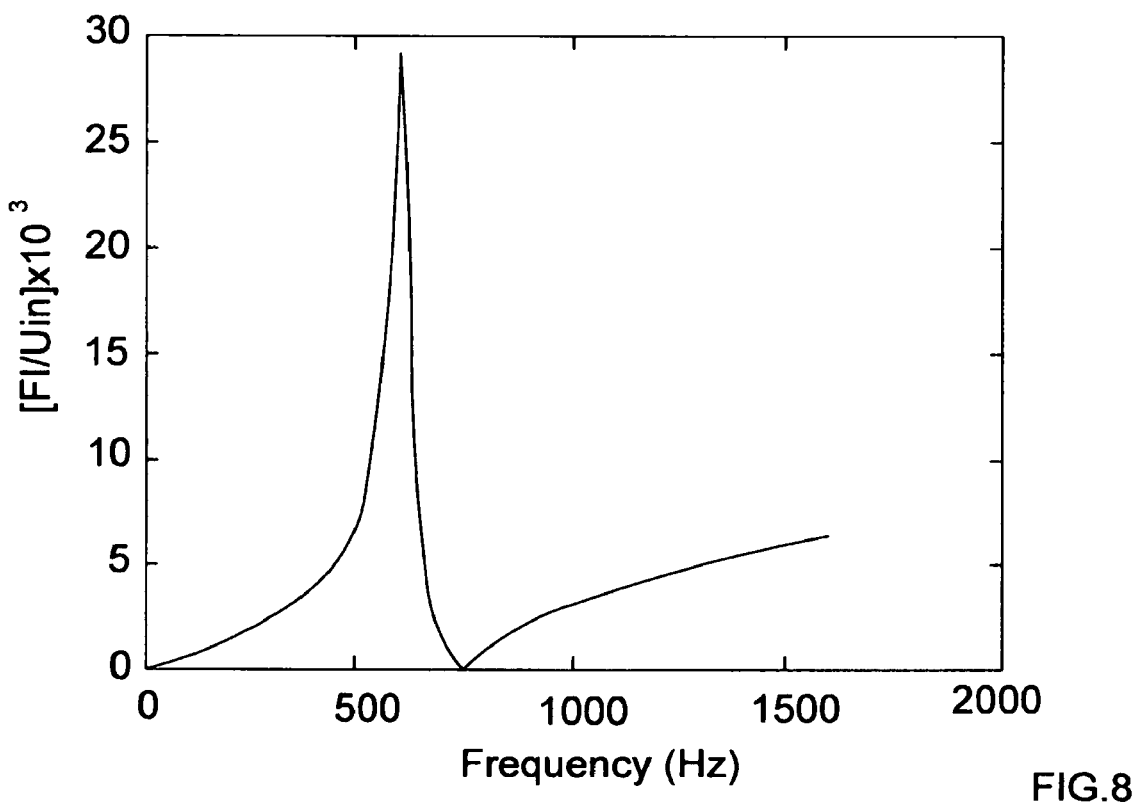
FIG. 8 is a graph showing variation of force applied to a masonry load with frequency for the drill of FIGS. 1 to 6.

In particular, FIG. 7 shows the modulus of hand-arm velocity reduction for the user of the drill, compared with ratchet input velocity, from which it can be seen that by suitably adjusting the spring force of springs 38, 42, 48, the transmission of vibrations to the user's hand is minimised at a ratchet plate frequency of 580 Hz. However, FIG. 8 shows the modulus of force applied to a masonry load by the drill 2 of FIGS. 1 to 6 compared to ratchet input velocity. At the relevant frequency of 580 Hz, it can be seen that the force delivered to the load is increased, while the vibrations transmitted to the user are decreased. It can therefore be seen that the drill 2 enables more effective operation of the drill for a given ratchet plate profile to be achieved, which minimises the effect of vibrations on the user.

The present invention uses the principle of dynamic absorption to minimise the transmission of harmful vibrations to the user. The high frequency vibrations at the ratchet plates act predominantly along the rotation axis 32, as a result of which the high frequency vibrations can be effectively attenuated by allowing limited axial movement of the motor stator 24 relative to the housing. The more harmful low frequency vibrations are caused predominantly by vibration of the drill bit in a hole being drilled in masonry, and produce components of low frequency vibration along all three axes, i.e. both along and perpendicularly to the axis 32. As a result, the low frequency vibrations are attenuated by springs 42, 48, which allow damped movement of the drill bit relative to the housing in all three directions.

It will be appreciated by persons skilled in the art that the above embodiment has been described by way of example only, and not in any limitative sense, and that various alterations and modifications are possible without departure from the scope of the invention as defined by the appended claims. For example, instead of using leaf springs 38 or compression springs 42, 48, solid links or rubber elements could also be used. Also, compression springs 42, 48 may be mounted between gearbox 10 and housing 4 instead of, or in addition to, between rear shaft bearing 28 and housing 4 or between front bearing 30 and housing 4.

The invention claimed is:

1. A power tool comprising:
   a housing;
   a motor within the housing for actuating a working member of the tool, the motor having a stator and a rotor adapted to rotate about a first axis relative to said stator; and
   first vibration attenuators which attenuate vibrations transmitted from said stator to said housing at least in a direction substantially parallel to said first axis;
   wherein the stator is displaceable relative to said housing in a direction substantially parallel to said first axis, and the first vibration attenuators comprises biasers which resist said displacement of said stator relative to the housing at least in a direction substantially parallel to said first axis;
   wherein said biasers comprises at least one resilient member; and
   wherein said biasers comprise a plurality of first said resilient members circumferentially spaced around said first axis and a plurality of second said resilient members offset from said first resilient members in a direction parallel to said first axis.

2. A tool according to claim 1, wherein said first resilient members are circumferentially offset relative to said second resilient members.

3. A tool according to claim 1, wherein at least one said resilient member comprises at least one respective leaf spring.

4. A tool according to claim 1, wherein the resilience of at least one said resilient member is adjustable.

5. A tool according to claim 3, wherein at least one said leaf spring comprises a plurality of removable spring members.

6. A tool according to claim 1, wherein the first vibration attenuators comprises a plurality of interchangeable said resilient members having different resiliencies.

7. A tool according to claim 1, wherein a plurality of said resilient members are connected between said stator and at least one support.

8. A tool according to claim 1, further comprising resilient second vibration attenuators attenuators which attenuating vibrations along three orthogonal axes transmitted from a working member of said tool to said housing.

9. A tool according to claim 8, wherein said second vibration attenuators act between at least one said support and said housing.

10. A tool according to claim 9, further comprising a gearbox connected to said motor, wherein said second vibration attenuators acts between said gearbox and said housing.

11. A tool according to claim 8, wherein said second vibration attenuators comprises a plurality of further resilient members.

12. A tool according to claim 11, wherein at least one first said further resilient member is connected between a bearing of said rotor and said housing.

13. A tool according to claim 11, comprising a plurality of said first further resilient members and a plurality of said second further resilient members, wherein said first and second further resilient members are circumferentially spaced about said first axis, and said first further resilient members are circumferentially offset relative to a said second further resilient members;
   wherein said first and second further resilient members are arranged substantially perpendicularly to said first axis.

14. A tool according to claim 13, further comprising at least one third further resilient member arranged substantially parallel to said first axis; wherein at least one said further resilient member has adjustable resilience; and
   wherein at least one said further resilient member comprises a respective spring acting against a respective abutment having adjustable position.

15. A power tool comprising:
   a housing;
   a motor within the housing, the motor having a stator and a rotor adapted to rotate about a first axis relative to said stator; and
   at least one first vibration attenuator for attenuating vibrations transmitted from said stator to said housing at least in a direction substantially parallel to said first axis, the at least one first vibration attenuator extending from a support to an outer circumference of the stator;
   wherein the at least first vibration attenuator comprises a plurality of vibration attenuators at a first axial end of the stator and a plurality of vibration attenuators at a second axial end of the stator opposite the first axial end; and
   wherein the first vibration attenuators comprise leaf springs.

16. A power tool according to claim 15, further comprising second vibration attenuators which attenuate vibrations along three orthogonal axes transmitted from a working member of said tool to said housing.

17. A power tool according to claim 16, further comprising a gearbox connected to said motor, wherein said second vibration attenuators act between said gearbox and said housing.

18. A power tool comprising:
   a housing;
   a motor within the housing, the motor having a stator and a rotor adapted to rotate about a first axis relative to said stator;

at least one first vibration attenuator for attenuating vibrations transmitted from said stator to said housing at least in a direction substantially parallel to said first axis; and second vibration attenuators which attenuate vibrations along three orthogonal axes transmitted from a working member of said tool to said housing;

wherein the at least one first vibration attenuator comprises a plurality of vibration attenuators at a first axial end of the stator and a plurality of vibration attenuators at a second axial end of the stator opposite the first axial end.

* * * * *